(12) United States Patent
Snowbarger (10) Patent No.: US 9,955,787 B2
(45) Date of Patent: May 1, 2018

(54) COMPOSITE CORE FURNITURE ITEMS

(71) Applicant: Halcon Inc., Stewartville, MN (US)

(72) Inventor: Jacob Edward Snowbarger, Rochester, MN (US)

(73) Assignee: Halcon Inc., Stewartville, MN (US)

( * ) Notice: Subject to any disclaimer, the term of this patent is extended or adjusted under 35 U.S.C. 154(b) by 228 days.

(21) Appl. No.: 14/501,681

(22) Filed: Sep. 30, 2014

(65) Prior Publication Data

US 2016/0088941 A1 Mar. 31, 2016

(51) Int. Cl.

| | |
|---|---|
| *B32B 7/02* | (2006.01) |
| *C09J 5/10* | (2006.01) |
| *A47F 5/00* | (2006.01) |
| *A47F 5/08* | (2006.01) |
| *A47B 96/02* | (2006.01) |

(Continued)

(52) U.S. Cl.
CPC .......... *A47B 96/021* (2013.01); *A47B 96/027* (2013.01); *B32B 5/22* (2013.01); *B32B 5/245* (2013.01); *B32B 5/26* (2013.01); *B32B 7/02* (2013.01); *B32B 7/12* (2013.01); *B32B 15/043* (2013.01); *B32B 15/046* (2013.01); *B32B 15/08* (2013.01); *B32B 15/10* (2013.01); *B32B 15/12* (2013.01); *B32B 15/14* (2013.01); *B32B 15/20* (2013.01); *B32B 17/061* (2013.01); *B32B 17/067* (2013.01); *B32B 21/02* (2013.01); *B32B 21/06* (2013.01); *B32B 21/10* (2013.01); *B32B 21/14* (2013.01); *B32B 27/12* (2013.01); *B32B 27/308* (2013.01); *B32B 29/02* (2013.01); *B32B 5/02* (2013.01); *B32B 5/18* (2013.01); *B32B 37/12* (2013.01); *B32B 37/18* (2013.01); *B32B 2250/40* (2013.01); *B32B 2262/0269* (2013.01); *B32B 2262/101* (2013.01); *B32B 2262/106* (2013.01); *B32B 2266/0235* (2013.01); *B32B 2266/0278* (2013.01); *B32B 2266/04* (2013.01); *B32B 2266/045* (2013.01); *B32B 2266/06* (2013.01); *B32B 2266/08* (2013.01); *B32B 2307/50* (2013.01); *B32B 2307/542* (2013.01); *B32B 2317/16* (2013.01); *B32B 2479/00* (2013.01)

(58) Field of Classification Search
None
See application file for complete search history.

(56) References Cited

U.S. PATENT DOCUMENTS

| | | | | |
|---|---|---|---|---|
| 3,192,099 A | * | 6/1965 | Beckman ............. | A47B 96/205 108/51.3 |
| 6,364,263 B1 | * | 4/2002 | Ryan ......................... | E06B 7/28 248/239 |

(Continued)

OTHER PUBLICATIONS

3M Scotch-Weld™ Epoxy Adhesive 1469 (http://multimedia.3m.com/mws/media/310928O/3mtm-scotch-weldtm-epoxy-adhesive-1469.pdf?fn=TDS_1469.pdf). Copyright 2004.*

(Continued)

*Primary Examiner* — David Sample
*Assistant Examiner* — Nicole T Gugliotta
(74) *Attorney, Agent, or Firm* — Fish & Richardson P.C.

(57) ABSTRACT

A composite core furniture item can include a multi-layered core (optionally including both metallic and non-metallic layers) that provides exterior major surfaces for application of top and bottom wood veneer layers or other exterior veneer layers via a heat catalyzed adhesive or other bonding process.

25 Claims, 5 Drawing Sheets

(51) Int. Cl.

| | | |
|---|---|---|
| *B32B 15/20* | (2006.01) | |
| *B32B 17/06* | (2006.01) | |
| *B32B 5/22* | (2006.01) | |
| *B32B 5/24* | (2006.01) | |
| *B32B 5/26* | (2006.01) | |
| *B32B 7/12* | (2006.01) | |
| *B32B 15/04* | (2006.01) | |
| *B32B 15/08* | (2006.01) | |
| *B32B 15/10* | (2006.01) | |
| *B32B 15/12* | (2006.01) | |
| *B32B 15/14* | (2006.01) | |
| *B32B 21/02* | (2006.01) | |
| *B32B 21/06* | (2006.01) | |
| *B32B 21/10* | (2006.01) | |
| *B32B 21/14* | (2006.01) | |
| *B32B 27/12* | (2006.01) | |
| *B32B 27/30* | (2006.01) | |
| *B32B 29/02* | (2006.01) | |
| *B32B 37/18* | (2006.01) | |
| *B32B 5/02* | (2006.01) | |
| *B32B 5/18* | (2006.01) | |
| *B32B 37/12* | (2006.01) | |

(56) References Cited

U.S. PATENT DOCUMENTS

| | | | |
|---|---|---|---|
| 2005/0069690 A1* | 3/2005 | Walz | A47B 17/006 428/292.4 |
| 2006/0003155 A1* | 1/2006 | Stewart | A47B 96/18 428/304.4 |
| 2007/0022694 A1* | 2/2007 | Chen | E04F 13/18 52/578 |

OTHER PUBLICATIONS

3M Scotch-Weld™ Epoxy Adhesive 1469 (http://multimedia.3m.com/mws/media/310928O/3mtm-scotch-weldtm-epoxy-adhesive-1469.pdf ?fn=TDS_1469.pdf).*

Caddie Adhesives (http://www.cattieadhesives.com/products/pur-hot-melt). Copyright 2012.*

DIAB, "Divinycell® H Technical Data," https://dragonplate.com/docs/divinycell.pdf, Published Mar. 2009.*

Composites World, http://www.compositesworld.com/products/structural-polymer-foam-core (Apr. 2011).*

Skylighter, http://www.skylighter.com/fireworks/help/kraft_paper_weights_and_thickness.asp (2007).*

Small et al., Henkel Cororation, "Fundamentals of Industrial Adhesives," http://na.henkel-adhesives.com/us/content_data/101407_AMP_Article_Feb_2005.pdf (Feb. 2005).*

Composite Panel Association, ANSI A208.2-2002, American National Standard, "Medium Density Fiberboard (MDF) for Interior Applications," 15 pages, May 13, 2002.

Green et al., "Mechanical Properties of Wood," Wood handbook—Wood as an engineering material, Forest Products Laboratory, Chpt. 4, pp. 4-1 to 4-45, 1999.

"Moarcas and Irle, ""Determination of Poisson's ratio for particleboard in pure bending,"" Wood Science and Technology, 33(5):439-444, Nov. 1999".

Schulte and Frühwald, "Shear modulus, internal bond and density profile of medium density fibre board (MDF)," Holz als Roh- und Werkstoff, 54(1):49-55, 1996.

American Institute of Timber Construction, *Timber Construction Manual*, John Wiley and Sons, Inc., 663 pages, 1966.

Divinycell® H, Technical Data Sheet, www.diabgroup.com, Mar. 2009, 1 page.

* cited by examiner

COMPOSITE CORE FURNITURE ITEMS

TECHNICAL FIELD

This specification relates to composite core furniture items.

BACKGROUND

Shelves and other furniture items are often used in flexible spaces, such as in commercial and institutional settings in order to utilize wall space for displaying or storing items. Shelving systems use a variety of techniques for supporting and maintaining a generally horizontal orientation. Some prior shelf designs utilize generally vertical supports upon which the horizontal portion of the shelf is supported, or from which the horizontal portion is suspended. Such supports are highly visible. Some prior shelf designs are so-called "floating" shelf designs, in which the horizontal portion is supported by supports hidden within the thickness of the portion, thereby requiring the shelf to have a substantial thickness in order to conceal the supports.

Panels made of wood or having the appearance of wood are widely used in the construction of furniture and home décor objects. Material innovation has provided objects that have become lighter in scale (e.g., thinner) while often satisfying the same function as their older and/or heavier appearing counterpart. However, the creation of similarly thin object with the appearance of wood has most commonly been prohibited by excessive costs of manufacturing and/or the poor appearance of wood film printed over alterative substrates.

SUMMARY

In general, this document describes composite core furniture items, such as composite core panels of other structural members used for shelves or work surfaces (e.g., a desk surface), which may be optionally supported in a cantilevered manner while providing a significantly high stiffness-to-thickness ratio. In some circumstances, the composite core furniture item can include a multi-layered core (optionally including both metallic and non-metallic layers) that provides exterior major surfaces for application of top and bottom wood veneer layers (or other exterior appearance layers) via a heat catalyzed adhesive or other bonding process. The multi-layered core can have a selected order of layers (having predetermined thicknesses) that provide a high degree of rigidity with a relatively low overall thickness, thereby providing a sleek and attractive shelf, work surface, or other furniture item that can withstand significant (cantilevered) loading with substantially reduced deflection. Additionally, in those particular embodiments, the final assembly of the furniture items can be readily customized in appearance because a wide variety of various wood veneers or other exterior veneers can be readily applied to the exterior major surfaces of the multi-layered core.

Some embodiments described herein include a multi-layered composite core panel for receiving wood veneer on an exterior thereof. The multi-layered composite core panel may include a central layer of non-ferrous material, which in particular embodiments may have a compressive strength greater than about 3 MPa. The multi-layered composite core panel may also include a pair of intermediate layers of non-ferrous material, which in particular embodiments may have a modulus of elasticity greater than about 70000 MPa. A central layer thickness of the central layer may be greater than ten times an intermediate layer thickness of each intermediate layer. A first of the intermediate layers may be adhered to a first major surface of the central layer, and a second of the intermediate layers may be adhered to a second major surface of the central layer opposite from the first major surface. The multi-layered composite core panel may further include a pair of outer core layers that each have an outer major surface that is more porous than the materials of the central layer and the intermediate layers. The pair of outer core layers may each have an outer core layer thickness less than the central layer thickness and (optionally) less than the intermediate layer thickness of each intermediate layer. A first of the outer core layers may be adhered to an outwardly facing major surface of the first intermediate layer, and a second of the outer core layers may be adhered to an outwardly facing major surface of the second intermediate layer. The multi-layered composite core panel has an overall thickness of less than about 13 mm (and specifically less than 10 mm in particular embodiments), and the outer major surfaces of the outer core layers are exposed for adhering with wood veneer layers.

Various embodiments described herein include a wood veneer shelf. The wood veneer shelf may include a first layer having a pair of opposing faces, and a pair of second layers. Each second layer may be disposed on one of the opposing faces of the first layer. The wood veneer shelf may also include a pair of third layers, and each third layer may be disposed upon one of the second layers. The wood veneer shelf may further include a pair of fourth layers, and each fourth layer disposed upon one of the third layers. The wood veneer shelf may have a maximum thickness of 13 mm or less, and the shelf may be configured to be cantilevered from a rear support at a proximal end while the shelf exhibits a maximum deflection of 5% or less at a projected edge (opposite from the proximal end) when loaded at 39 lbs-42 lbs per running foot of the shelf.

Some embodiments described herein include a method for forming a wood veneer furniture item. The method may include bonding a pair of opposing second layers to opposing major surfaces of central layer. The method may also include bonding the opposing second layers with a pair of opposing third layers to form a multi-layered composite core. The method may further include bonding the opposing third layers of the multi-layered composite core with a pair of outer veneer layers to provide a furniture item having a maximum thickness of 13 mm or less and being configured to deflect 5% or less at a projected edge when under a cantilever load at 39 lbs-42 lbs per running foot.

The items and techniques described here may provide one or more of the following advantages. First, in some embodiments, a composite core furniture item can provide a structural member having a relatively high stiffness-to-thickness ratio. As such, the composite core furniture item can provide a structural member that exhibits comparatively little deflection under load, such as cantilevered load, even though the structural member has a relatively minimal thickness (e.g., about 13 mm or less in some embodiments). For example, in particular embodiments, the furniture item can include a composite core panel (e.g., a multi-layered core having thin wood veneer layers applied to the exterior of the multi-layered core) suitable for use as a cantilevered wall shelf, and the composite core panel can have an overall thickness of about 13 mm or less (about 10.5 mm (including the outer veneer layers) in some embodiments) while being configured to deflect at its cantilevered edge only 5% or less of the projected face (about 0.25% to about 5% of the projected face, and preferably about 1% or less of the projected face in some implementations) when loaded at about 37 lbs/running foot to about 42 lbs/running foot. This comparatively minimal deflection for such thin composite core panel can advantageously provide both a very thin profile and an attractive aesthetic appeal (even under relatively heavy loaded conditions).

Second, in particular embodiments, the composite core furniture item can include a multi-layered core including five layers (some of which are metallic and others or which are non-metallic) that are arranged in a particular order so as to provide a thin, yet stiff, core having porous exterior major surfaces configured to readily receive any of a wide variety of various wood veneers or other exterior veneers. Thus, not only is the final assembly of the layered structural member or panel rigid and thin, but it is also readily customizable to provide different exterior finishes to suit different installations.

Third, in some embodiments of the composite core furniture item can, the multi-layered core can include two external layers of semi-porous material that are compatible with wood adhesives (such as PVA (polyvinyl acetate) adhesives), two intermediate high-tensile-strength layers (preferably a non-ferrous metal layer such as aluminum, or optionally a carbon fiber layer), and a central high-shear strength layer (such as medium density fiberboard (MDF) material or a polyurethane foam material). The layers of the core can be bonded with intervening adhesive layers using an adhesive material that is both moisture resistant and heat compatible (such as a high temperature polyurethane adhesive or an epoxy adhesive). Such a multi-layered core-without the outer veneer layers applied thereto—can be formed as a relatively thin panel core (e.g., less than 13 mm thickness, about 4 mm to about 12 mm, and about 9.5 mm in particular embodiments) that may be stored, optionally shipped to other locations, and then subsequently receive exterior wood veneers (or other veneer layers) along the exposed external (top and bottom) layers of semi-porous material that is specifically suited for bonding with veneer adhesives (such as heat catalyzed adhesive).

The details of one or more implementations are set forth in the accompanying drawings and the description below. Other features and advantages will be apparent from the description and drawings, and from the claims.

DETAILED DESCRIPTION OF ILLUSTRATIVE EMBODIMENTS

This document describes composite core furniture items and techniques for creating composite core furniture items.

In general, some furniture users prefer furniture items, such as shelves or horizontal working surfaces (e.g., table tops, desk tops, etc.), that have very thin profiles. For example, in some circumstances, particular users desire the aesthetic appeal of so-called "floating" (e.g., cantilever supported) shelving units, in which the shelves' lack of visible supports gives an illusion that the shelves are defying gravity while firmly supporting the load of the items placed in the shelf. According to some users, the illusion and the visual impact of such shelving units can be somewhat inversely proportional to the thickness of the shelf, e.g., the thinner the shelf, the greater the visual impact and appeal.

In general, the multi-layered composite panels described in this document can provide both visual appeal and mechanical utility. The panels described herein can optionally have an exterior appearance of wood, a stiffness substantially greater than the stiffness of traditional wood-veneered particle board panels of comparable thickness, and can be subsequently cut and drilled with tools and machines normally used to process traditional wood-veneered particle board panels.

Figure 1:
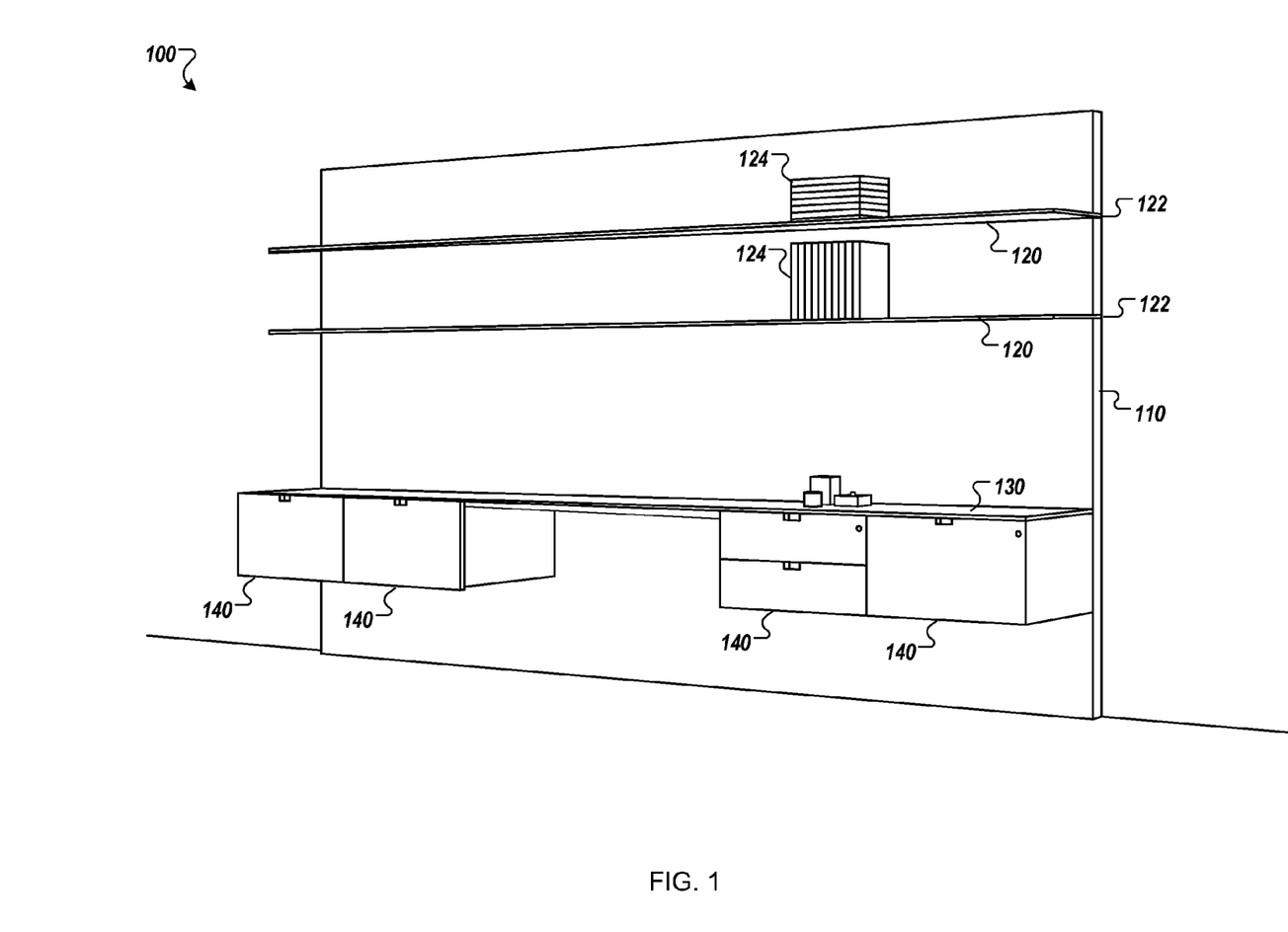
FIG. 1 is a perspective view of an example of a composite core furniture item, in accordance with some embodiments.

Referring to FIG. 1, a perspective view of an example of a composite core furniture item 100 is shown. In the illustrated example, the composite core furniture item 100 is a shelving unit that includes a collection of shelves 120, a desktop 130, and a collection of drawers 140 (which, optionally, are mounted to a vertical back panel 110). In some embodiments, some or all of the components of the composite core furniture item 100 may be made of composite core sheets that will be discussed in the descriptions of FIGS. 2-5.

The shelves 120 are configured as so-called "floating" shelves, in which each shelf 120 is cantilever, e.g., projecting horizontally outward from the vertical back panel 110 and supported only at a proximal edge 122. In some embodiments, the vertical back panel 110 can be mounted to a wall, or the vertical back panel 110 can be a wall (e.g., a wall with slots to provide cantilever support for the shelves 120). The shelves 120 have sufficient stiffness to support a collection of loads 124 (e.g., books or other items) placed on the shelves 120. The shelves 120 have an appearance of wood and stiffness that allows them to carry relatively greater loads than wood-veneered particle board shelves of similar thickness.

Still referring to FIG. 1, the shelves 120 constructed according to embodiments described herein can provide a relatively high stiffness-to-thickness ratio, thereby providing a composite core furniture item 120 that exhibits comparatively little deflection under a cantilevered load even though the item 120 has a relatively minimal thickness (e.g., about 13 mm or less, and about 10.5 mm in this example). For example, in particular embodiments, the furniture item 120 can include a multi-layered core (refer, for example, to multi-layered core 455 in FIG. 4 below) having thin wood veneer layers applied thereto so that the item 120 has a relatively low thickness (about 10.5 mm in this example) while being configured to deflect at its cantilevered edge only 5% or less of the projected face (about 0.25% to about 5% of the projected face, and preferably about 1% or less of the projected face in some implementations) when loaded at about 37 lbs/running foot to about 42 lbs/running foot. This comparatively minimal deflection for such thin composite core furniture item 120 can provide both a thin profile and an attractive aesthetic appeal (even under loaded conditions).

Figure 2:
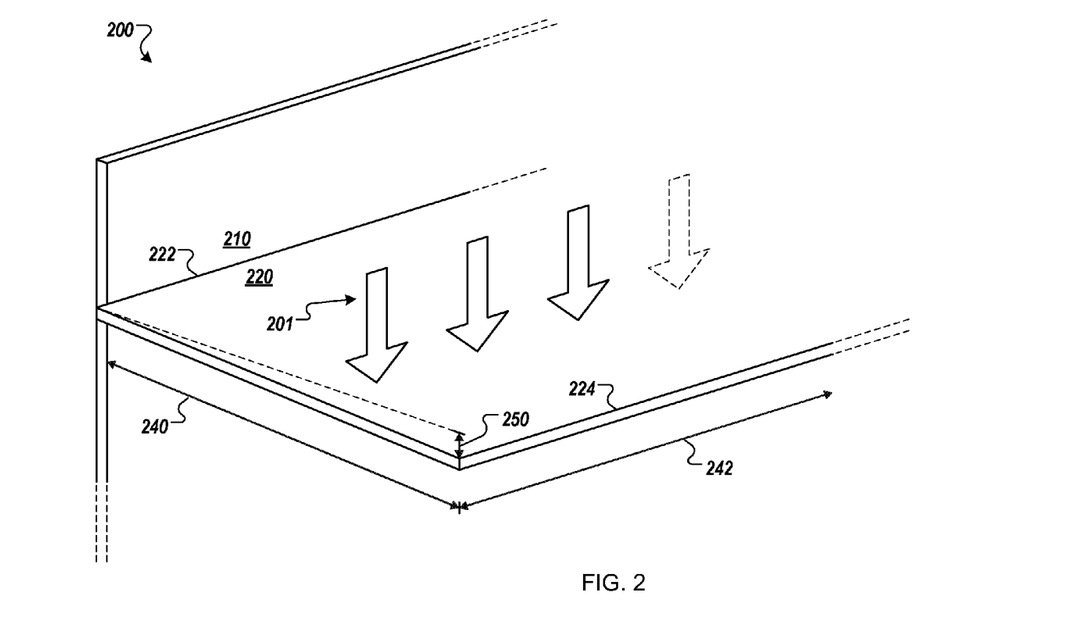
FIG. 2 is a perspective view of the composite core furniture item of FIG. 1 under a loaded condition.
Figure 3:
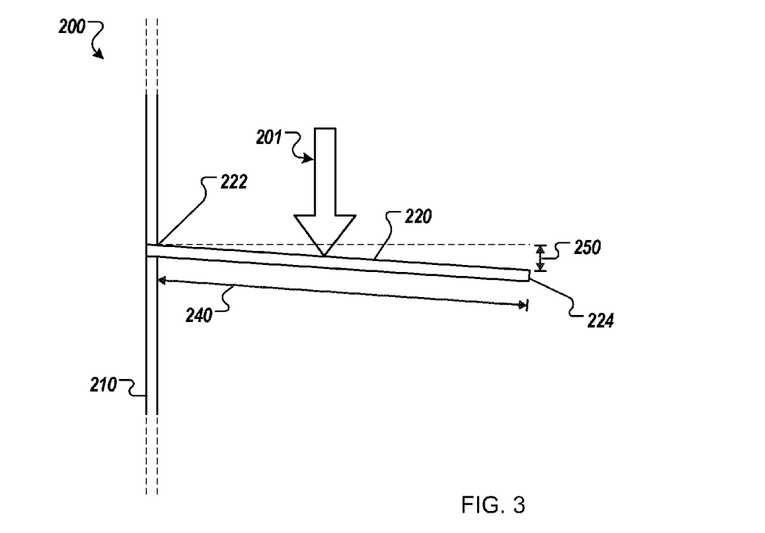
FIG. 3 is a side view of the composite core furniture item of FIG. 2.

Referring to FIGS. 2 and 3, a load as represented by arrows 201 is applied to an example of a composite core furniture item 200. The composite core furniture item 200 includes a vertical back panel 210 and a shelf 220, which can be the same as shelf 120 depicted in FIG. 1. The shelf 220 is cantilever-supported by the vertical back panel 210 at a proximal edge 222. In some embodiments, the vertical back panel 210 can be the vertical back panel 110 of FIG. 1, and the shelf 220 can be one of the shelves 120.

The shelf has a depth 240 of projection from the vertical back panel 210, and a length 242 running along the vertical back panel 210. The load 201 (e.g., the mass of items under the influence of gravity) is represented as an equivalent point load applied at a midpoint along the depth 240. The load 201 causes a deflection 250 at a projected edge 224. As previously described, the shelf 220 in this example in thin (about 10.5 mm in this example) but is also configured to deflect at its cantilevered edge 224 by a substantially minimal amount. For example, the shelf 220 may be cantilevered loaded at about 37 lbs/running foot to about 42 lbs/running foot, yet the cantilevered edge 224 may deflect at only about 0.5% to about 5% of the projected face, and preferably about 1% of the projected face in this example). Accordingly the shelf 220 can advantageously provide both a thin profile and an attractive appearance.

Figure 4:
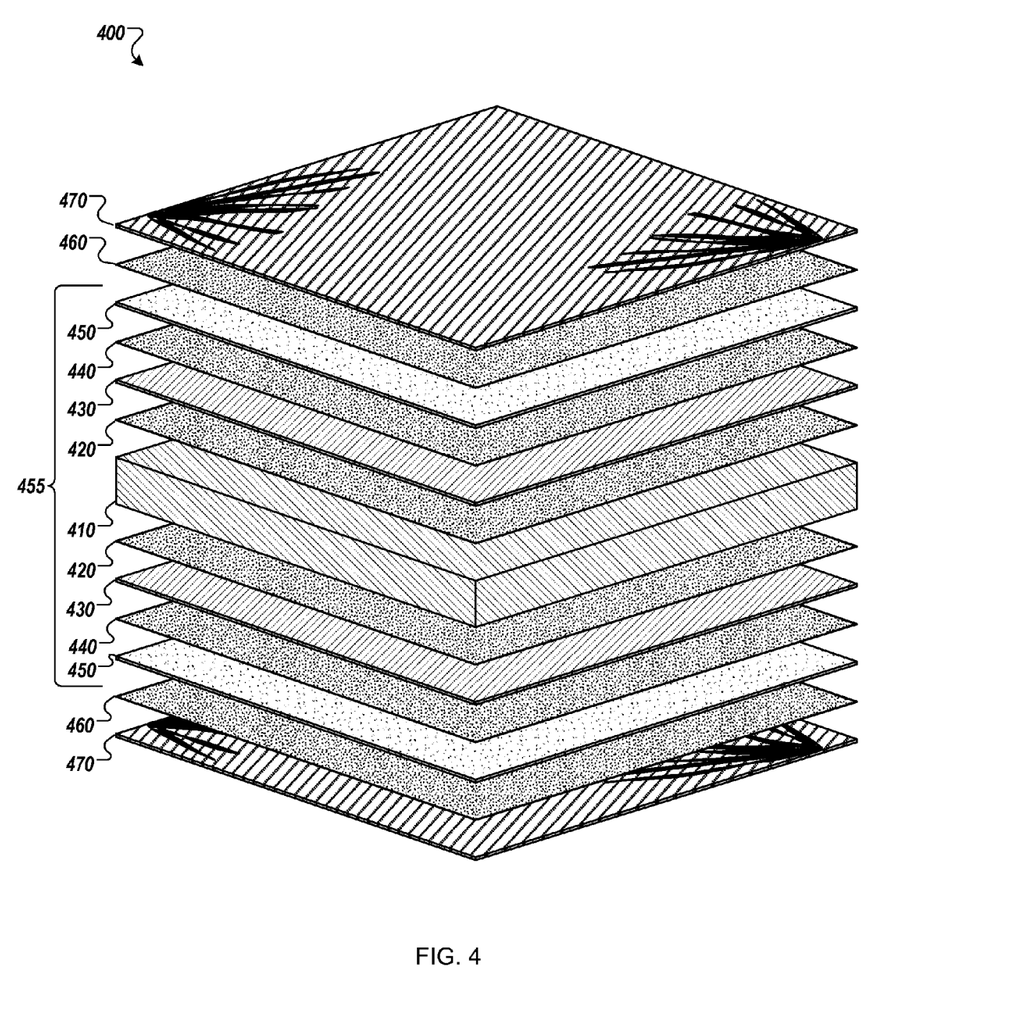
FIG. 4 is an exploded perspective view of layers of the composite core furniture item of FIG. 1, in accordance with particular embodiments.

Referring to FIG. 4 a composite core furniture item 400, which as described in more detail below, includes both a multi-layered composite core 455 and outer veneer layers 470 bonded thereto. In some embodiments, the composite core furniture item 400 may be used as the composite core furniture items 100 and/or 200 of FIGS. 1-3. For example, the composite core furniture item 400 may serve as all or a section of the shelves 120 or 220, the desktop 130, and/or the drawers 140. In its assembled form, the composite core furniture item 400 can have a total thickness of less than 12 mm, about 5 mm to about 12 mm, and about 10.5 mm in this example.

The composite core 400 is made up of multiple sublayers. A layer 410 forms a central layer of the composite core 400. The layer 410 is formed of a high shear strength, non-ferrous material. In some embodiments, the layer 410 can comprise a medium density fiberboard (MDF, e.g., grades 2 or 3) or another non-metallic material having a compressive strength of greater than about 3 MPa. In this embodiment the layer 410 comprises MDF so that a majority of the peripheral edge height of the core 400 is particularly suited for applying an edgeband (not shown in FIG. 4). In some alternative embodiments, the layer 410 can be aluminum, carbon fiber, fiberglass, end grain balsa lay-ups (e.g., as commercially available from DIAB), polyurethane foams (e.g., DIVINYCELL H160 commercially available from DIAB), open-celled glassy carbon foams, structural carbon foams, stabilized aluminum foams, microwave/RF foam substrates, polymer foam, closed-cell PVC foam, aramid fiber/phenolic resin composites, para-aramid/phenolic composites, fiberglass/phenolic composites, polymethacrylimide sheets. In some embodiments, the layer 410 can have a thickness of about 4 mm to about 12 mm, and about 8 mm in this example.

A pair of coatings 420 are applied to the opposing faces of the layer 410. The coatings 420 are an adhesive that is formulated to bond the layer 410 to a pair of intermediate layers 430. In some embodiments, one or both of the coatings 420 can be a high temperature polyurethane adhesive or epoxy. For example, one or both of the coatings 420 can maintain its structural integrity up to about 250 degrees F.

Still referring to FIG. 4, the intermediate layers 430 in this embodiment are formed of a high tensile strength, non-ferrous material having a modulus of elasticity greater than about 70000 MPa. In some embodiments, one or both of the layers 430 can be made of aluminum, carbon fiber (e.g., bi-directional woven carbon fiber), or any other appropriate high tensile strength (e.g., modulus of elasticity greater than about 70000 MPa), non-ferrous material compatible with high temperature polyurethane or epoxy adhesives. In some embodiments, one or both of the layers 430 can each be about 0.1 mm to about 1.0 mm thick, and about 0.5 mm thick in this example.

A pair of coatings 440 are applied to the layers 430. The coatings 440 are an adhesive that is formulated to bond the layer 430 to a pair of outer core layers 450 of the multi-layered core 455. In some embodiments, one or both of the coatings 440 can be a high temperature polyurethane adhesive or epoxy. For example, one or both of the coatings 440 can maintain its structural integrity up to about 250 degrees F.

In this embodiment, the outer core layers 450 are formed of a semi-porous (e.g., having a porosity similar to that of a craft paper and suitable for bonding with wood adhesives), non-ferrous material. In some embodiments, the layers 450 are compatible with traditional wood adhesives, e.g., polyvinyl acetate (PVA). For example, the layers 450 can be formed of paper, such as a craft paper, or another flexible fibrous material having porous qualities suitable for receiving with traditional wood adhesives. In some embodiments, the combined thickness of one of the layers 450 and one of the coatings 440 can be about 0.10 m to about 0.50 mm, and about 0.25 mm in this example.

Accordingly, still referring to FIG. 4, in this example the multi-layered core 455 includes five material layers 410, 430 (top and bottom), and 450 (top and bottom) that are bonded with an adhesive material that is both moisture resistant and heat compatible (such as a high temperature polyurethane adhesive or an epoxy adhesive). Such a multi-layered core can be formed as a relatively thin panel core (e.g, less than 13 mm thickness, about 4 mm to about 12 mm, and about 9.5 mm in particular embodiments) that may be stored, optionally shipped to other locations, and then subsequently receive exterior wood veneers or other veneer layers (refer to layers 470 described below) along the exposed external (top and bottom) layers of semi-porous layers 450 that are specifically suited for bonding with veneer adhesives (such as heat catalyzed adhesive).

For example, a pair of coatings 460 can be applied to the layers 450. The coatings 460 are an adhesive that is formulated to bond the layer 450 to a pair of veneer layers 470. In some embodiments, one or both of the coatings 460 can be a heat catalyzed adhesive, such as PVA or the like.

The veneer layers 470 in this example are thin sheets of wood veneer. In some embodiments, one or both of the veneer layers 470 can be sheets of any appropriate type of non-ferrous facing material. In some embodiments, one or both of the veneer layers 470 can have a thickness of about 0.2 mm to about 1.0 mm, and about 0.5 mm in this example. Accordingly, the overall thickness of the composite core furniture item 400 can be about 13 mm or less, and about 10.5 mm in this example, yet it can provide a structure rigidity that is often found in traditional wood-veneered particle board panels having a significantly larger thickness.

As such, the composite core furniture item 400 can be used, for example, as a shelf or work surface (e.g., a desk surface or a table surface), which may be supported in a cantilevered manner while providing a significantly high stiffness-to-thickness ratio. The multi-layered core 400 in this example has a selected order of layers 410, 430, 450, and 470 (all having predetermined thicknesses) that provide a high degree of rigidity with a relatively low overall thickness, thereby providing a sleek and attractive shelf, work surface, or other furniture item that can withstand significant loading with substantially reduced deflection. Additionally, because the veneer layer 470 can be selected from a wide group of optional veneer layers having different exterior appearances, the final assembly of the furniture item 400 can be readily customized in appearance.

Figure 5:
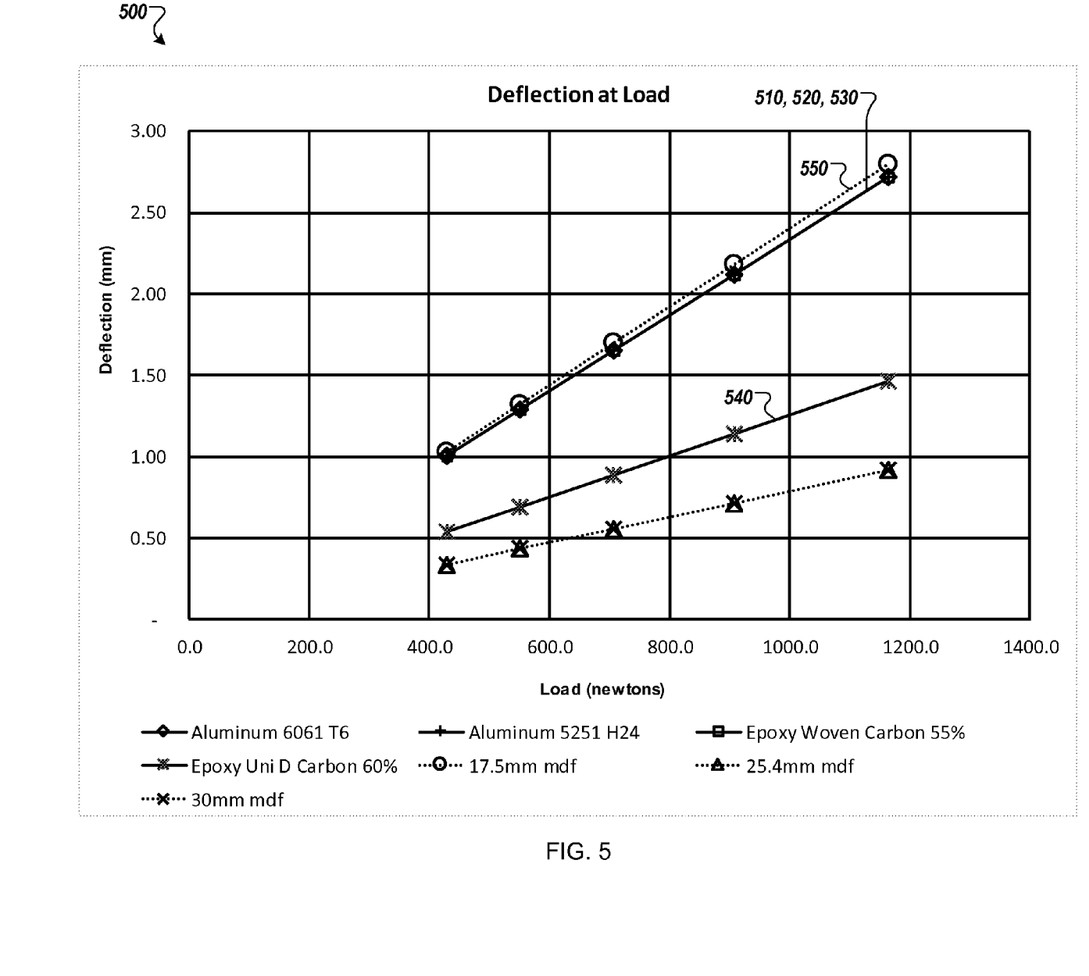
FIG. 5 is a chart showing a comparison between the deflection of an example composite core furniture item under a load condition, and the deflections of other non-composite core furniture items under load.

Referring to FIG. 5, a chart 500 shows an approximate comparison between the deflection (under a cantilevered load) of an example composite core 455 (no outer wood veneer layers thereon), and the deflections (under the same cantilevered load) of particle board cores (like those used in traditional wood-veneered particular board shelves but with no outer wood veneer layers thereon) having greater thicknesses. In this working example, the cores are all have lengths of 1524 mm (60 inches) and functional depths of 330 mm (13 inches), and thus could be used as cores in cantilevered shelves (after a wood veneer is applied). The x-axis represents a load to be applied to each core, measured in Newtons, and the y-axis represents the approximate deflection of the distal edge of the cores (e.g., similar to the projected edge 224 in FIG. 2) measured in millimeters.

As shown in this working example comparing the deflections of the multi-layered composite core 455 to other particle board cores. The deflection of a composite core having a 9.5 mm thickness (without the outer veneer layers applied thereto) and the intermediate layers 430 being formed of 6061 T6 aluminum is represented by line 510; at an applied mass of 707 Newtons, the deflection is estimated to be approximately 1.65 mm. The deflection of a composite core having a 9.5 mm thickness (without the outer veneer layers applied thereto) and the intermediate layers 430 being formed of 5251 H24 aluminum is represented by line 520; at an applied mass of 707 Newtons, the deflection is estimated to be approximately 1.65 mm. The deflection of a composite core having a 9.5 mm thickness (without the outer veneer layers applied thereto) and the intermediate layers 430 being formed of epoxy woven carbon (55%) is represented by line 530; at an applied mass of 707 Newtons, the deflection is estimated to be approximately 1.65 mm. The deflection of a composite core having a 9.5 mm thickness (without the outer veneer layers applied thereto) and intermediate layers 430 being formed of epoxy Uni-D carbon is represented by line 540; at an applied mass of 707 Newtons, the deflection is estimated to be approximately 0.89 mm.

The deflections represented by the lines 510-540 are all less than or similar to the deflection of the particle board core having a much greater thickness (17.5 mm), which is represented by line 550 in FIG. 5. Accordingly, it is believed the multi-layered composite core 455 (constructed according to the various embodiments described herein) can provide load-bearing performance that is better than or similar to the load-bearing performance of a traditional particle board core having nearly twice (1.86$x$) the thickness of the composite core 455.

Figure 6:
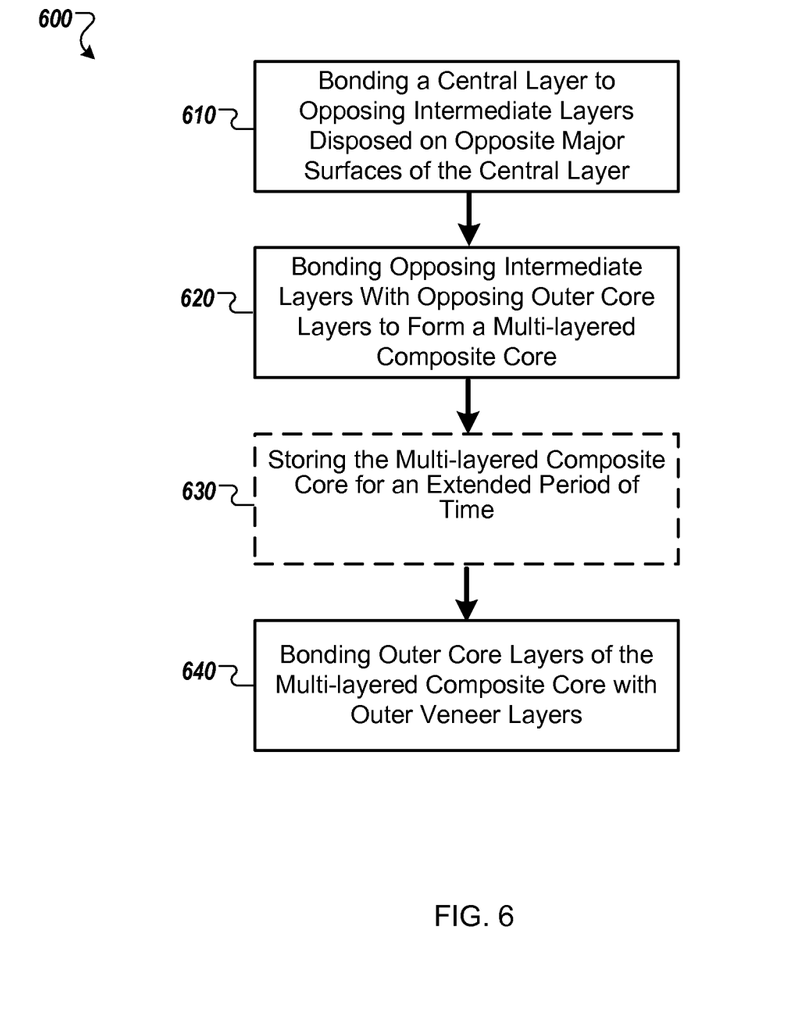
FIG. 6 is a chart showing a process of forming a composite core furniture item, in accordance with some implementations.

Referring now to FIG. 6, some implementations of a process 600 can be used to for a composite core furniture item, such as a shelf panel or other composite core panel for a horizontal work surface as previously described. The process 600 may include operation 610 in which a central layer of non-metallic material is bonded with opposing intermediate layers of high-tensile-strength material (preferably a non-ferrous metal layer such as aluminum, or optionally a carbon fiber layer). The central layer may be a high-shear strength layer, such as a layer of medium density fiberboard (MDF) material or a polyurethane foam material. As previously described in connection with FIG. 4, the central layer may have a thickness that is significantly greater than the intermediate layers, such as at least 10 times greater in thickness, about 10 to about 20 times greater in thickness, and preferably about 16 times greater in thickness. For example, if the central layer is about 8 mm thick, each intermediate layer may be about ½ mm thick. The intermediate layers can be bonded to opposing major surfaces (e.g., top and bottom major surfaces) of the central layer using intervening adhesive layers comprising an adhesive material that is both moisture resistant and heat compatible (such as a high temperature polyurethane adhesive or an epoxy adhesive).

The process 600 may also include operation 620 in which the opposing intermediate layers are bonded with opposing outer core layers of semi-porous material. For example, the semi-porous material of the outer core layers can include a thin paper material, such as craft paper, that is particularly suited for receiving veneer adhesives. The outer core layers of semi-porous material can be bonded to outwardly opposing major surfaces of the intermediate layers using intervening the same adhesive material that is both moisture resistant and heat compatible (such as a high temperature polyurethane adhesive or an epoxy adhesive).

Accordingly, the central layer, the intermediate layers on opposing surfaces of the central layer, and the outer core layers on the opposing surfaces of the intermediate layers can collectively form a multi-layered composite core having a relatively high stiffness-to-thickness ratio while also having exposed outer surfaces that are prepared for receiving any of a wide variety of wood veneer layers or other veneer layers according to a user's selected appearance preferences. For example, in some embodiments, the multi-layered core can have a relatively thin the core thickness (before the veneer layers are applied thereto), such as less than 13 mm thickness, about 4 mm to about 12 mm, and about 9.5 mm in particular embodiments.

Still referring to FIG. 6, the process 600 may further include optional operation 630 in which the multi-layered composite core is stored (e.g., in a storage area, in a vehicle during shipment, or both) for an extended period, such as 1 day or more. This optional operation 630 can be implemented before any wood veneer layers (or other veneer layers) are applied to the multi-layered composite core.

The process 600 may also include operation 640 in which outer veneer layers are bonded to the outer major surfaces of the opposing outer core layers of semi-porous material. The outer veneer layers can be selected from a larger group of outer veneer layers having different appearances so that the final appearance of the item is customizable. For example, a first wood veneer layer can be adhered to a first major surface of a first outer core layer in which the semi-porous material is outwardly exposed. The first wood veneer layer can be adhered thereto using a heat catalyzed adhesive (such as a PVA (polyvinyl acetate) adhesive). Likewise, a second wood veneer layer can be adhered to an opposite major surface of a second outer core layer in which the semi-porous material is outwardly exposed. As such, in some implementations, the multi-layered core can be stored, optionally shipped to other locations, and then subsequently receive exterior wood veneers (or other veneer layers) along the exposed external (top and bottom) layers of semi-porous material that is specifically suited for bonding with veneer adhesives (such as a heat catalyzed adhesive).

Although a few implementations have been described in detail above, other modifications are possible. For example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A multi-layered composite core panel for receiving wood veneer on an exterior thereof, the multi-layered composite core panel comprising:
    a central layer of non-ferrous material having a compressive strength greater than about 3 MPa and having a first major surface, a second major surface opposite the first major surface, first, second, third, and fourth peripheral edges between the first major surface and the second major surface, and a central layer thickness that separates the first major surface and the second major surface, the central layer thickness uniform throughout the central layer;
    a pair of intermediate layers of non-ferrous material having a modulus of elasticity greater than about 70000 MPa, the central layer thickness being greater than ten times an intermediate layer thickness of each intermediate layer, a first of the intermediate layers being directly adhered to the first major surface of the central layer, and a second of the intermediate layers being directly adhered to the second major surface of the central layer opposite from the first major surface; and
    a pair of outer core layers that each have an outer major surface that is more porous than the materials of the central layer and the intermediate layers and that each have an outer core layer thickness less than the central layer thickness and less than the intermediate layer thickness of each intermediate layer, a first of the outer core layers being directly adhered to an outwardly facing major surface of the first intermediate layer, and a second of the outer core layers being directly adhered to an outwardly facing major surface of the second intermediate layer,
    wherein the multi-layered composite core panel has an overall thickness of less than about 13 mm and the outer major surfaces of the outer core layers are exposed for adhering with wood veneer layer while the first, second, third, and fourth peripheral edges of the central layer remain exposed.

2. The multi-layered composite core panel of claim 1, wherein the central layer is a material selected from the group comprising: medium density fiberboard (MDF) and polyurethane foam, aluminum, aluminum foam, end grain balsa lay-up, and fiberglass.

3. The multi-layered composite core panel of claim 2, wherein the central layer thickness is less than 12 mm.

4. The multi-layered composite core panel of claim 1, wherein the pair of intermediate layers is a material selected from the group comprising: aluminum and carbon fiber.

5. The multi-layered composite core panel of claim 4, wherein each intermediate layer has a thickness of about 0.5 mm or less.

6. The multi-layered composite core panel of claim 4, wherein the intermediate layers are adhered to the central layer by a high temperature polyurethane adhesive or epoxy.

7. The multi-layered composite core panel of claim 4, wherein the intermediate layers are adhered to the outer core layers by a high temperature polyurethane adhesive.

8. The multi-layered composite core panel of claim 1, wherein the outer core layers comprise a semi-porous, non-ferrous material compatible with wood adhesives, each of the outer core layers having a thickness of about 0.25 mm or less.

9. A shelf comprising said multi-layered composite core panel of claim 1, further comprising a pair of fourth layers bonded to said multi-layered composite core panel, each fourth layer disposed upon one of the outer core layers of said multi-layered composite core panel, wherein the shelf article has a maximum thickness of 13 mm or less, the shelf configured to be cantilevered from a rear support at a proximal end such that the shelf exhibits a maximum deflection of 5% or less at a projected edge when loaded at 39 lbs-42 lbs per running foot of the shelf.

10. The shelf of claim 9, wherein the central layer of said multi-layered composite core panel, the pair of intermediate layers of said multi-layered composite core panel, the pair of outer core layers of said multi-layered composite core panel, and the pair of fourth layers are non-ferrous.

11. The shelf of claim 10, wherein the pair of fourth layers comprises a pair of exterior wood veneer layers bonded to the outer major surfaces of the pair of outer core layers of said multi-layered composite core panel.

12. The shelf of claim 10, wherein the central layer of said multi-layered composite core panel is selected from a group comprising: medium density fiberboard (MDF) and polyurethane foam, aluminum, aluminum foam, end grain balsa lay-up, and fiberglass.

13. The shelf of claim 12, wherein the central layer is less than about 8 mm thick.

14. The shelf of claim 13, wherein at least one of the intermediate layers of said multi-layered composite core panel is formed of a high tensile strength, non-ferrous material.

15. The shelf of claim 13, wherein each of the intermediate layers of said multi-layered composite core panel is selected from a group comprising: aluminum and carbon fiber.

16. The shelf of claim 15, wherein at least one of the intermediate layers of said multi-layered composite core panel has a thickness of about 0.5 mm or less.

17. The shelf of claim 16, wherein at least one of the outer core layers of said multi-layered composite core panel is formed from a semi-porous, non-ferrous material.

18. The shelf of claim 16, wherein at least one of the outer core layers of said multi-layered composite core panel is formed of paper.

19. The shelf of claim 18, wherein at least one of the fourth layers is formed of a wood veneer.

20. The shelf of claim 19, wherein said at least one of the fourth layers is less than about 0.5 mm thick.

21. The shelf of claim 9, further comprising a pair of first coatings disposed between the central layer and each of the intermediate layers of said multi-layered composite core panel, wherein at least one of the first coatings is formed of a high-temperature polyurethane adhesive or a high-temperature polyurethane epoxy.

22. The shelf of claim 21, further comprising a pair of second coatings disposed between the intermediate layers and a respective adjacent one of the outer core layers of said multi-layered composite core panel, wherein at least one of the second coatings is formed of a high-temperature polyurethane adhesive or a high-temperature polyurethane epoxy.

23. The shelf of claim 22, further comprising a pair of third coatings disposed between the outer core layers of said multi-layered composite core panel and a respective adjacent one of the fourth layers, wherein at least one of the third coatings is formed of a high-temperature polyurethane.

24. The multi-layered composite core panel of claim 1, wherein the central layer is a material selected from the group comprising: medium density fiberboard (MDF) and polyurethane foam, aluminum, aluminum foam, end grain balsa lay-up, and fiberglass, and the central layer thickness is less than 12 mm; wherein the pair of intermediate layers is a material selected from the group comprising: aluminum and carbon fiber, and each intermediate layer has a thickness of about 0.5 mm or less; and wherein the outer core layers comprise a non-ferrous material compatible with wood adhesives, each of the outer core layers having a thickness of about 0.25 mm or less.

25. The multi-layered composite core panel of claim 1, wherein the central layer comprises medium density fiberboard, the first and second intermediate layers comprise carbon fiber, and the carbon fiber is directly adhered to the medium density fiberboard.

\* \* \* \* \*